US011323542B2

(12) United States Patent
Wang

(10) Patent No.: US 11,323,542 B2
(45) Date of Patent: May 3, 2022

(54) OBJECTION BLOCKING METHOD, TERMINAL, SERVER, AND STORAGE MEDIUM

(71) Applicant: TENCENT TECHNOLOGY (SHENZHEN) COMPANY LIMITED, Shenzhen (CN)

(72) Inventor: Lingling Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 20 days.

(21) Appl. No.: 16/521,243

(22) Filed: Jul. 24, 2019

(65) Prior Publication Data

US 2019/0349451 A1 Nov. 14, 2019

Related U.S. Application Data

(63) Continuation of application No. PCT/CN2018/092319, filed on Jun. 22, 2018.

(30) Foreign Application Priority Data

Jun. 30, 2017 (CN) .......................... 201710524127.7

(51) Int. Cl.
*G06F 15/16* (2006.01)
*H04L 67/63* (2022.01)
(Continued)

(52) U.S. Cl.
CPC .......... *H04L 67/327* (2013.01); *G06F 3/0484* (2013.01); *H04L 67/02* (2013.01); *H04L 67/42* (2013.01)

(58) Field of Classification Search
CPC ....... H04L 67/327; H04L 67/02; H04L 67/42; G06F 3/0484

(Continued)

(56) References Cited

U.S. PATENT DOCUMENTS 6,367,012 B1 * 4/2002 Atkinson ................ G06F 21/51
713/167
9,027,140 B1 * 5/2015 Watkins .................. G06F 21/56
726/24

(Continued)

FOREIGN PATENT DOCUMENTS

CN 102231875 A 11/2011
CN 103634311 A 3/2014
(Continued)

OTHER PUBLICATIONS

The World Intellectual Property Organization (WIPO) International Search Report for PCT/CN2018/092319 dated Aug. 29, 2018 6 Pages (including translation).

*Primary Examiner* — Cheikh T Ndiaye
*Assistant Examiner* — Ayele F Woldemariam
(74) *Attorney, Agent, or Firm* — Anova Law Group, PLLC

(57) ABSTRACT

An object blocking method, a terminal, a server, and a storage medium are provided. The method includes: sending, when whether to block a target object cannot be determined according to a first blocking strategy library, feature information of the target object to a server. The feature information instructs the server to generate a target blocking strategy according to the feature information and feed back the target blocking strategy. The method also includes: receiving the target blocking strategy fed back by the server; adding the target blocking strategy to the first blocking strategy library; and performing subsequent object blocking according to the first blocking strategy library added with the target blocking strategy, including: determining whether to block the target object according to the target blocking strategy in the first blocking strategy library.

17 Claims, 11 Drawing Sheets

(51) Int. Cl.
  *G06F 3/0484*  (2022.01)
  *H04L 67/02*  (2022.01)
  *H04L 67/01*  (2022.01)

(58) Field of Classification Search
  USPC ........................................................ 709/203
  See application file for complete search history.

(56) References Cited

U.S. PATENT DOCUMENTS

| | | | |
|---|---|---|---|
| 9,876,896 B1* | 1/2018 | Gailloux | H04L 63/06 |
| 2002/0087630 A1 | 7/2002 | Wu | |
| 2006/0235960 A1* | 10/2006 | Lai | H04L 63/0227 |
| | | | 709/224 |
| 2010/0082432 A1* | 4/2010 | Feng | G06Q 30/02 |
| | | | 705/14.53 |
| 2011/0137925 A1* | 6/2011 | Baird | G06Q 30/02 |
| | | | 707/758 |
| 2015/0371267 A1* | 12/2015 | Porat | G06Q 30/0269 |
| | | | 705/14.55 |
| 2016/0092938 A1* | 3/2016 | Tang | G06Q 30/0277 |
| | | | 705/14.73 |
| 2016/0140611 A1* | 5/2016 | Schler | G06F 16/9535 |
| | | | 705/14.55 |

FOREIGN PATENT DOCUMENTS

| | | | |
|---|---|---|---|
| CN | 103684971 A | | 3/2014 |
| CN | 104159154 A | | 11/2014 |
| CN | 104992110 A | * | 10/2015 |
| CN | 104992110 A | | 10/2015 |
| CN | 107204989 A | | 9/2017 |

* cited by examiner

OBJECTION BLOCKING METHOD, TERMINAL, SERVER, AND STORAGE MEDIUM

CROSS-REFERENCES TO RELATED APPLICATION

This application is a continuation application of PCT Patent Application No. PCT/CN2018/092319, filed on Jun. 22, 2018, which claims priority to Chinese Patent Application No. 201710524127.7, entitled "ADVERTISEMENT BLOCKING METHOD, TERMINAL, SERVER, AND STORAGE MEDIUM" filed with the China National Intellectual Property Administration on Jun. 30, 2017, the entire contents of both of which are incorporated herein by reference.

FIELD OF TECHNOLOGY

Embodiments of this application relate to the technical field of Internet, and in particular, to an object blocking method, a terminal, a server, and a storage medium.

BACKGROUND OF THE DISCLOSURE

Users are often disturbed by objects (for example, advertisements) that pop up automatically when going shopping, playing games, or querying information over a network. To prevent the objects that pop up from disturbing the users, how to accurately block objects has become an important research topic in the technical field of Internet.

SUMMARY

Embodiments of this application provide an object blocking method, a terminal, a server, and a storage medium. The technical solutions are described as follows:

According to a first aspect of the embodiments of this application, an object blocking method, applied to a terminal device, is provided. The method includes: sending, when whether to block a target object cannot be determined according to a first blocking strategy library, feature information of the target object to a server. The feature information instructs the server to generate a target blocking strategy according to the feature information and feed back the target blocking strategy. The method also includes: receiving the target blocking strategy fed back by the server; adding the target blocking strategy to the first blocking strategy library; and performing subsequent object blocking according to the first blocking strategy library added with the target blocking strategy, including: determining whether to block the target object according to the target blocking strategy in the first blocking strategy library.

According to a second aspect of the embodiments of this application, an object blocking method, applied to a server, is provided and includes: receiving feature information of a target object sent by a terminal device, the feature information is information sent by the terminal device when the terminal device cannot determine whether to block the target object according to a first blocking strategy library; generating a target blocking strategy according to the feature information; and sending the generated target blocking strategy to the terminal device, the target blocking strategy being used for instructing the terminal device to add the target blocking strategy to the first blocking strategy library.

According to a third aspect of the embodiments of this application, a terminal is provided and includes a processor and a memory, the memory storing at least one instruction, at least one program, a code set, or an instruction set, and the at least one instruction, the at least one program, the code set, or the instruction set being loaded and executed by the processor to perform the following: sending, when whether to block a target object cannot be determined according to a first blocking strategy library, feature information of the target object to a server. The feature information instructs the server to generate a target blocking strategy according to the feature information and feed back the target blocking strategy. The processor is also configured to perform: receiving the target blocking strategy fed back by the server; adding the target blocking strategy to the first blocking strategy library; and performing subsequent object blocking according to the first blocking strategy library added with the target blocking strategy, including: determining whether to block the target object according to the target blocking strategy in the first blocking strategy library.

According to a fourth aspect of the embodiments of this application, a server is provided and includes a processor and a memory, the memory storing at least one instruction, at least one program, a code set, or an instruction set, and the at least one instruction, the at least one program, the code set, or the instruction set being loaded and executed by the processor to implement the object blocking method according to the second aspect.

According to a fifth aspect of the embodiments of this application, a non-transitory computer readable storage medium is provided, the storage medium storing at least one instruction, at least one program, a code set, or an instruction set. The at least one instruction, the at least one program, the code set, or the instruction set being loaded and executed by the processor to perform the following: sending, when whether to block a target object cannot be determined according to a first blocking strategy library, feature information of the target object to a server. The feature information instructs the server to generate a target blocking strategy according to the feature information and feed back the target blocking strategy. The at least one instruction, the at least one program, the code set, or the instruction set also cause the processor to perform: receiving the target blocking strategy fed back by the server; adding the target blocking strategy to the first blocking strategy library; and performing subsequent object blocking according to the first blocking strategy library added with the target blocking strategy, including: determining whether to block the target object according to the target blocking strategy in the first blocking strategy library.

According to a sixth aspect of the embodiments of this application, a computer storage medium is provided, the storage medium storing at least one instruction, at least one program, a code set, or an instruction set, the at least one instruction, the at least one program, the code set, or the instruction set being loaded and executed by the processor to implement the object blocking method according to a second aspect.

BRIEF DESCRIPTION OF THE DRAWINGS

To describe the technical solutions in the embodiments of this application more clearly, the following briefly describes the accompanying drawings required for describing the embodiments. Apparently, the accompanying drawings in the following description show merely some embodiments of this application, and a person of ordinary skill in the art may still derive other drawings from these accompanying drawings without creative efforts.

DESCRIPTION OF EMBODIMENTS

To make objectives, technical solutions, and advantages of this application clearer, the following further describes in detail implementations of this application with reference to the accompanying drawings.

To facilitate description, terms involved in each embodiment are introduced briefly.

A basic idea of Content Delivery Network (CDN) is to avoid, as far as possible, bottlenecks and links on Internet that may possibly influence a data transmission speed and stability, to transmit content more quickly and stably.

Cloud Database (CDB) connects a plurality of data storage units dispersed physically through a high-speed computer network, to form a logically unified database. It may store data in an original centralized database dispersedly in a plurality of data storage nodes connected through a network, to obtain a larger storage capacity and a higher concurrent traffic volume.

Cloud File Storage (CFS) provides an extensible shared file storage service and a standard network file system access protocol, provides a shared data source for a plurality of cloud servers, supports an infinite capacity and performance extensibility, may be installed and used without modifying an existing application, is a distributed file system with high availability and high reliability, and is suitable for scenes such as big data analysis, media processing, and content management. In this application, an object may include an advertisement.

In some embodiments, an object blocking method includes: when an object pops up automatically, detecting, by a client, whether to block the object according to a locally set blocking strategy, and blocking or releasing the object according to a detection result.

In the foregoing embodiments, when a new type of object appears, according to the foregoing blocking method, it is possible that whether to block the new object cannot be determined. Regarding an object for which a client cannot determine whether to block, the client usually directly releases the object by default. Apparently, the released object may cause some trouble to a user. Therefore, objects that may be blocked by the foregoing solution are limited, and an accuracy rate of object blocking is relatively low.

Figure 1:
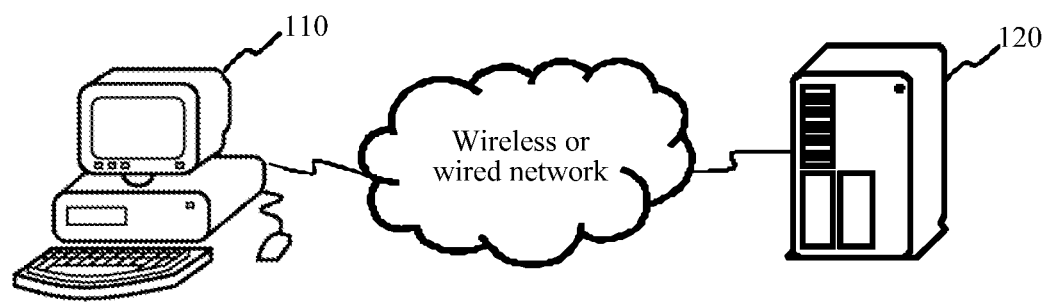
FIG. 1 is a schematic diagram of an implementation environment involved by an object blocking method according to each embodiment of this application.

FIG. 1 is a schematic diagram of an implementation environment involved by an object blocking method according to each embodiment of this application. As shown in FIG. 1, the implementation environment may include a terminal 110 and a server 120.

The terminal 110 refers to a terminal that may be connected to a network, for example, a mobile phone, a tablet computer, a desktop computer, or an electronic reader. The terminal 110 may be connected to the server 120 through a wired or wireless network. During actual implementation, a client may be installed in the terminal 110, and the client may be a client that may perform security management on the terminal 110. For example, the client may be a security guarder, anti-virus software, and so on. The client may be a client installed in the terminal 110 by default, or may also be a client installed in the terminal 110 by customization.

The server 120 may be a server, a server cluster including a plurality of servers, or a cloud computing service center. During actual implementation, the server 120 is configured to provide a background service for the client installed in the terminal 110.

Figure 2:
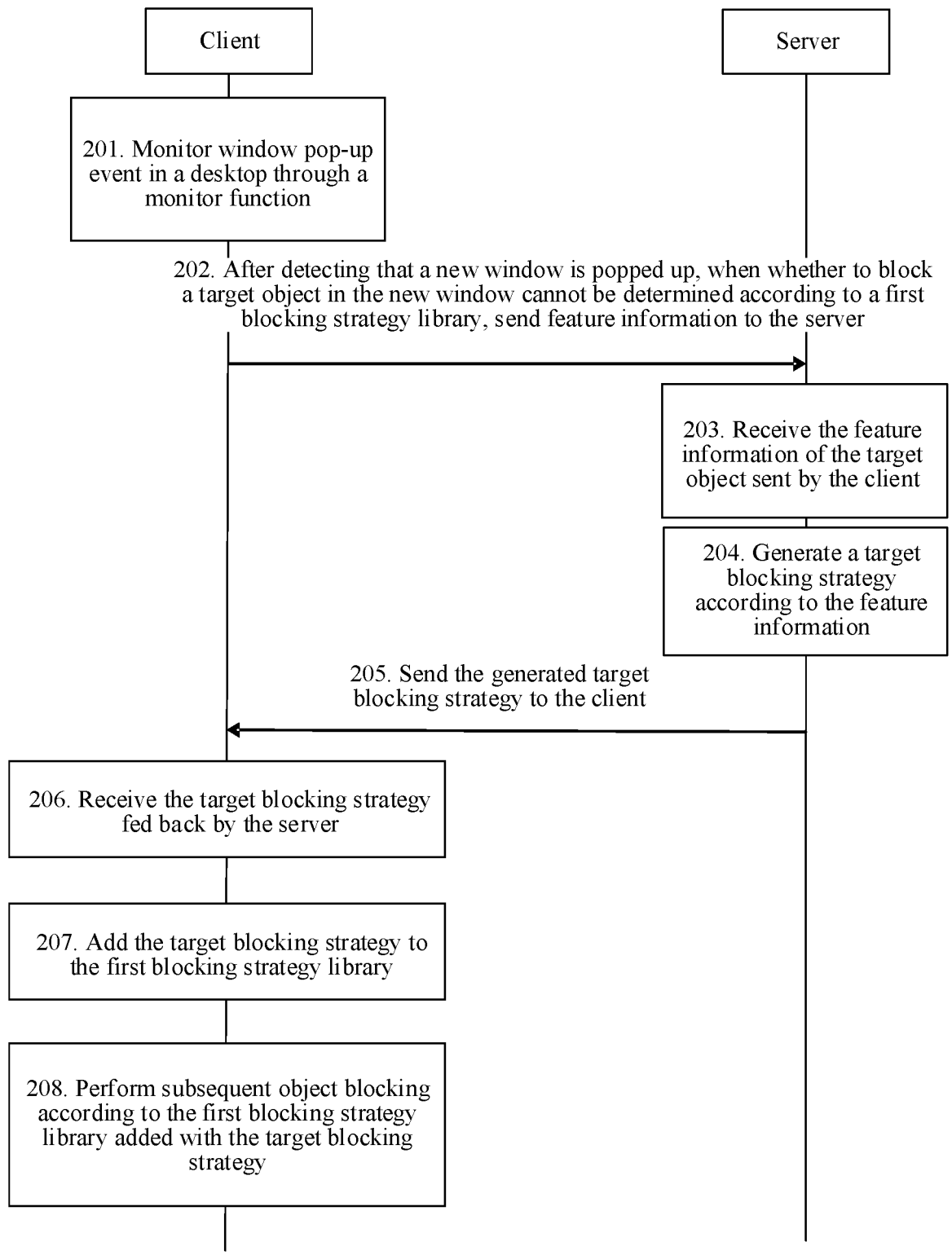
FIG. 2 is a flowchart of an object blocking method according to an embodiment of this application.

FIG. 2 is a method flowchart of an object blocking method according to an embodiment of this application. For example, in some embodiments, the object blocking method is used in an implementation environment shown in FIG. 1. The method is applied to the terminal 110. As shown in FIG. 2, the object blocking method may include the following steps:

Step 201: A client monitors a popup window that is changed in a desktop through a monitor function. In other words, window popup events is monitored. The window popup event may occur in/on a desktop interface on the client device.

The monitor function refers to a function for monitoring window changes in a system. The monitor function is a program instruction in the client. When the client is running, the monitor function is triggered to monitor a popup window in the desktop that is changed. The window changes herein include an added window, a window position change, a window size change, and a window being closed. When the client is a client installed in a Windows system, the monitor function may be SetWinEventHook.

The client may monitor the popup window that is changed in the desktop in real time through the monitor function.

Step 202: In response to detecting that a new window is popped up, determine whether to block a target object according to the first blocking strategy library, the new window carrying the target object. Further, when whether to block the target object in the new window cannot be determined according to a first blocking strategy library, the client sends feature information to the server.

When the new window is monitored to pop up, it indicates that the terminal may possibly have a new object. At this time, to avoid the problem that the object in the new window may possibly bring some trouble to a user, the client may detect whether to block a target object in the new window according to the local first blocking strategy library. If the detection result is to block, the client directly blocks the target object; if the detection result is not to block, the client directly releases the target object; and if the detection result is that whether to block the target object cannot be determined, the client may send feature information of the target object to the server. The first blocking strategy library includes one or more blocking strategies, each blocking strategy includes one or more object attribute dimensions, and attribute parameters under the attribute dimensions included by each blocking strategy may not be different. For example, the attribute dimensions may include: an object window size, an object window title, an object window position, an object publisher name, and object publisher code. When whether to block the new window is determined according to the first blocking strategy library, feature information of the new window is extracted, and the feature information is matched with a strategy in the first blocking strategy library. When blocking is determined when the feature information is matched with a strategy in the first blocking strategy library, and otherwise, blocking is not determined when the feature information is not matched with a strategy in the first blocking strategy library.

The first blocking strategy library is a strategy library that is obtained and stored in advance in the client. Furthermore, the first blocking strategy library may include at least one type of the following content:

First, strategies that are pre-written in the client. For example, when the client is published, many blocking strategies may be pre-written in the client by a designer.

Second, strategies obtained and stored from the server in advance. For example, when the server updates the blocking strategies, the server may send blocking strategies that are newly added or changed to the client, and correspondingly, the client receives and stores the blocking strategies sent by the server, and add the received blocking strategies to the first blocking strategy library.

Third, strategies set and stored in the client by a user in advance.

When the user uses the client, the user may set blocking strategies in the client, for example, setting black and white lists. Correspondingly, the client stores the set blocking strategies.

Figure 3:
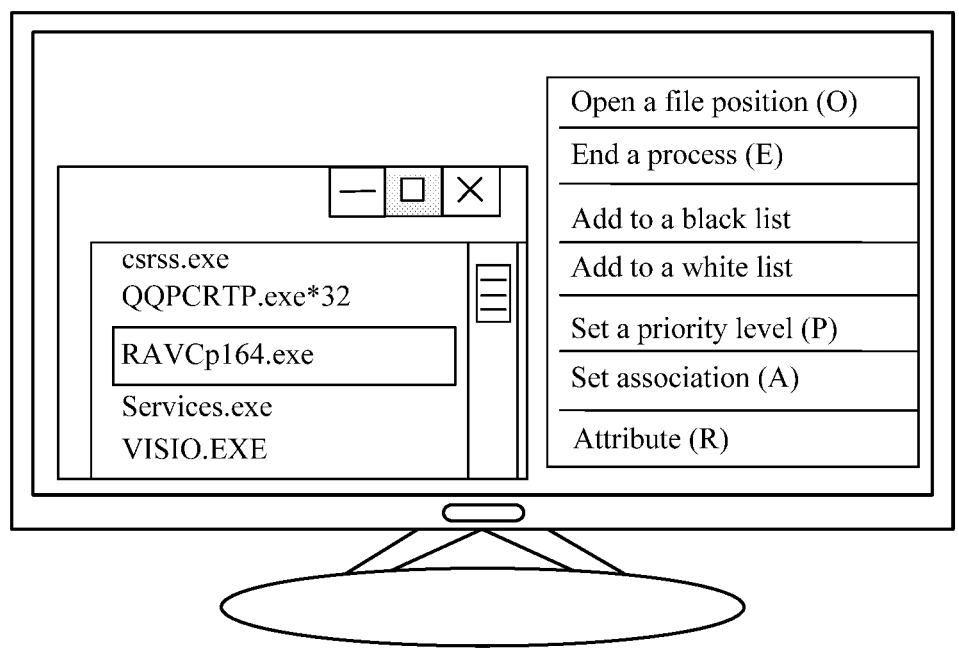
FIG. 3 is a schematic diagram of setting black and white lists according to an embodiment of this application.

The client may display each procedure that is running and receive a setting instruction for setting a certain procedure as a procedure that needs to be blocked or a procedure that needs to be released. After the setting instruction is received, the corresponding procedure is set as a procedure that needs to be blocked or a procedure that needs to be released. Correspondingly, the client stores the setting in the first blocking strategy library. For example, referring to FIG. 3, the user single-clicks a right key after selecting any procedure, and after receiving the single-clicking instruction, the client displays options "Add to the black list" and "Add to the white list" shown in FIG. 3, the user selects a desired option to set black and white lists, all objects of all procedures in the black list are set to be blocked, and all objects of all procedures in the white list are set to be released.

The client opens a task manager, and after the task manager is opened, each procedure that is being executed is displayed.

That the client detects whether to block the target object according to the first blocking strategy library includes: obtaining, by the client, the feature information of the target object, and detecting whether to block the target object according to the feature information and the first blocking strategy library. The feature information may include at least one of publisher information of a publisher publishing the target object and window information of a popup window displaying the target object. The publisher information includes at least one of publisher file information, Portable Executable (PE) file information, and program information. The window information includes at least one of a window size, a window title, a window position, a screenshot Hash value, and a window screenshot. The publisher information is information for representing a publisher of an object. For example, when the object is an advertisement, the information of the publisher may be a name, a merchant code, or the like of an advertiser. The PE file information refers to a program file in an operating system. During actual implementation, the PE file information may include an executable program (exe) file of a program, a Dynamic Link Library (DLL) file, and so on. The program information refers to information for representing a program to which the object belongs. For example, a certain object is push information of a client A, the program information may include a name of A. When the feature information includes the publisher information and the window information at the same time, the client may first obtain the publisher information and then obtain the window information, or the client may obtain the publisher information and the window information at the same time, or the client may first obtain the window information and then obtain the publisher information.

For example, the first blocking strategy library includes black and white lists. The black and white lists include one or more detection strategies. It is detected that an attribute dimension in a strategy includes a procedure and a publisher. For example, the client may obtain the publisher information of the target object and detects, according to the publisher information, whether the publisher information matches the publisher corresponding to the procedure set in the black and white lists. When the publisher information matches the publisher corresponding to the procedure set in the black and white lists, the target object is blocked, and otherwise, the target object is not blocked. Furthermore, for example, the obtained publisher information is PE file information, the client detects that the PE file information matches the procedure set in the black list, and then, the target object is blocked.

When the client sends the feature information of the target object to the server, the client may encrypt the feature information through a preset encryption algorithm, and then send the encrypted feature information to the server. The preset encryption algorithm may include a Message-Digest Algorithm 5 (MD5), an Advanced Encryption Standard (AES), and a Digital Signature Algorithm (DSA).

In the related technology, a specified area of a desktop is scanned regularly, and when it is determined, through scanning, that the specified area includes an object, whether to block the object is detected. However, in some embodiments, a change of the window in the desktop is monitored by using the monitor function, that is, all new popup windows in the desktop may be monitored without using regular scanning to determine whether a new popup window exists, to solve the problem in the related technology that the client needs to scan the specified area regularly, which may be ineffective sometimes and wastes the processing performance of the client. Meanwhile, in the related technology, when an object provided by a certain object provider is not in a usual object displaying area, the object cannot be detected. However, in some embodiments, the object can also be monitored through the monitor function, to enhance accuracy of object blocking and avoid the problem that some objects may be missed and not detected.

Step 203: The server receives the feature information of the target object sent by the client.

Step 204: The server generates a target blocking strategy according to the feature information.

Step 205: The server sends the generated target blocking strategy to the client.

Step 206: The client receives the target blocking strategy fed back by the server.

Step 207: The client adds the target blocking strategy to the first blocking strategy library.

Step 208: The client perform subsequent object blocking according to the first blocking strategy library added with the target blocking strategy. For example, based on the target blocking strategy added to the first blocking strategy library, the client can now determine whether to block the target object. In addition, the client can also determine whether to block the target object for future/subsequent occurrences of the target object and/or object having similar feature information of the target object.

Actual implementation of Steps 203 to 208 will be introduced in detail in the following embodiments.

In view of the above, in the object blocking method in some embodiments, through adding interaction between the client and the server, when the client cannot determine whether to block the target object according to the first blocking strategy library, the client sends the feature information of the target object to the server, the server may generate the corresponding target blocking strategy according to the received feature information and feed back the same, and the client blocks following objects according to the first blocking strategy library added with the target blocking strategy, to achieve the effect that when a similar object appears subsequently, the client may determine whether to block the object according to the first blocking strategy library added with the target blocking strategy and an accuracy rate of object blocking is enhanced.

Figure 4:
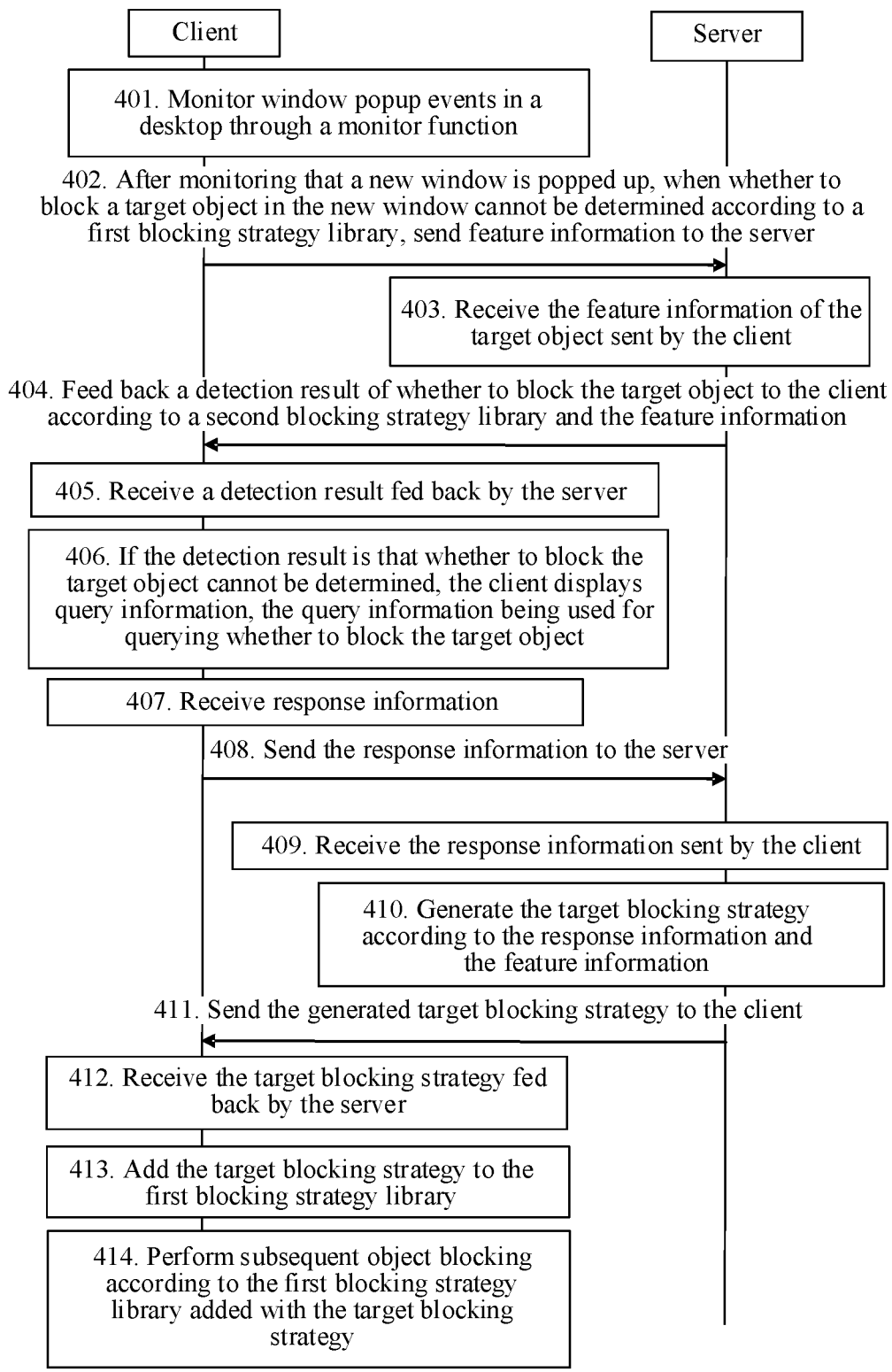
FIG. 4 is another flowchart of an object blocking method according to another embodiment of this application.

FIG. 4 is another method flowchart of an object blocking method according to another embodiment of this application. For example, in some embodiments, the object blocking method is used in an implementation environment shown in FIG. 1. The method is applied to a server. As shown in FIG. 4, the object blocking method may include the following steps:

Step 401: A client monitors a popup window that is changed in a desktop through a monitor function.

Step 402: After monitoring that a new window is popped up, when whether to block a target object in the new window cannot be determined according to a first blocking strategy library, the client sends feature information to the server.

Step 403: The server receives the feature information of the target object sent by the client.

Steps 401 to 403 are similar to Steps 201 to 203 in the foregoing embodiment, and will not be described herein repeatedly.

Step 404: The server feeds back a detection result of whether to block the target object to the client according to a second blocking strategy library and the feature information.

The second blocking strategy library is a blocking strategy library that is pre-stored in the server. The second blocking strategy library may include blocking strategies set when the client is published or may include blocking strategies generated and stored after the client is published. The second blocking strategy library may be more comprehensive than the first blocking strategy library. The first blocking strategy library aims at blocking of objects on one client, and the second blocking strategy library aims at blocking of objects on a plurality of clients served by the server. For example, when the server generates a target blocking strategy according to the feature information of the target object, the server may add the target blocking strategy to the second blocking strategy library, and the server may only send the target blocking strategy to the client that feeds back the feature information corresponding to the target object. The detection manner that the server detects whether to block the target object according to the second blocking strategy library and the feature information is similar to the detection manner in the foregoing embodiment that the client detects whether to block the target object according to the first blocking strategy library.

Step 405: The client receives a detection result fed back by the server. When the detection result is to block the target object, the client blocks the target object, and when the detection result is not to block the target object, the target object is not released.

Step 406: If the detection result is that whether to block the target object cannot be determined, the client displays query information, the query information being used for querying whether to block the target object.

Figure 5:
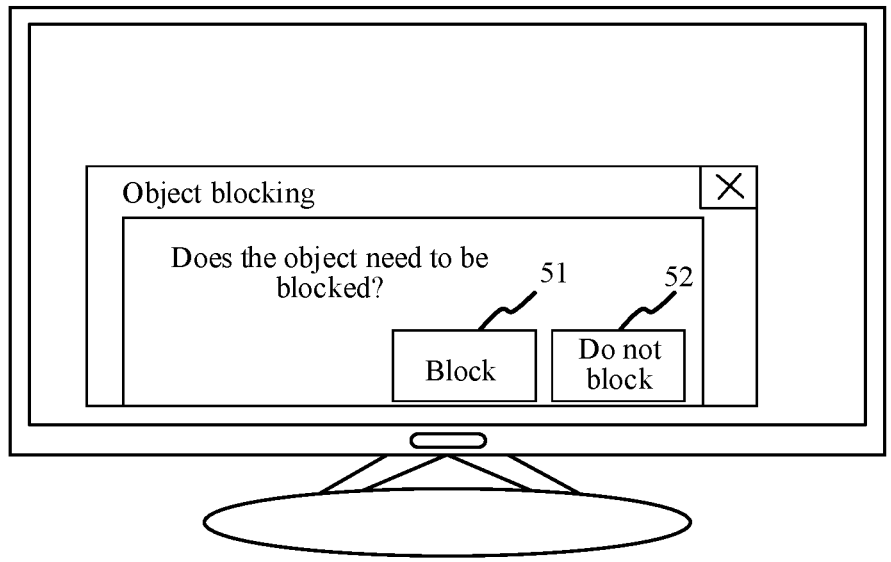
FIG. 5 is a schematic diagram of querying a user for whether to block a target object according to another embodiment of this application.

The client may display the query information at a preset position. For example, the query information is displayed at an upper layer of the popup window of the target object. Furthermore, for example, the query information is displayed in a preset area of the desktop, for example, the query information is displayed at a central position of the desktop. FIG. 5 is a schematic diagram of one possibility that the client displays query information.

Step 407: The client obtains response information corresponding to the query information.

After the client displays the query information, the user may select to block or release the target object. Therefore, the corresponding client may receive corresponding response information.

For example, referring to FIG. 5, if receiving a selection instruction of selecting an option 51 "Block", the client may obtain the response information of blocking the target object.

Step 408: The client sends the response information to the server.

The response information is used for instructing the server to generate the target blocking strategy according to the response information and the feature information and feed back the target blocking strategy.

Step 409: The server receives the response information sent by the client.

Step 410: The server generates the target blocking strategy according to the response information and the feature information.

The server may receive response information and corresponding feature information sent by each client and generate the target blocking strategy according to the received response information and feature information. The target blocking strategy includes a plurality of attribute dimension parameters of the target object. A learning platform may be set in the server. Through the learning platform, various types of received feature information and response information is learned, to obtain a rule of whether to block an object. The rule of blocking an object may be provided to a backstage supporter to determine or update the attribute dimension in the blocking strategy.

After receiving the feature information, the server may provide the feature information to a manual operating platform, the manual operating platform continues to extract features, so that the server may generate a rule of whether to block the object according to the extracted feature and the corresponding response information. For example, the object is blocked when the object includes a feature A; the object is released when the object includes a feature B; and so on.

Step 411: The server sends the generated target blocking strategy to the client.

It should be noted that, after generating the target blocking strategy, the server may further add the target blocking strategy to the second blocking strategy library. The server may send the target blocking strategy to all the clients that are connected to the server and may also only send the target blocking strategy to the client that feeds back the feature information corresponding to the target object.

Figure 6:
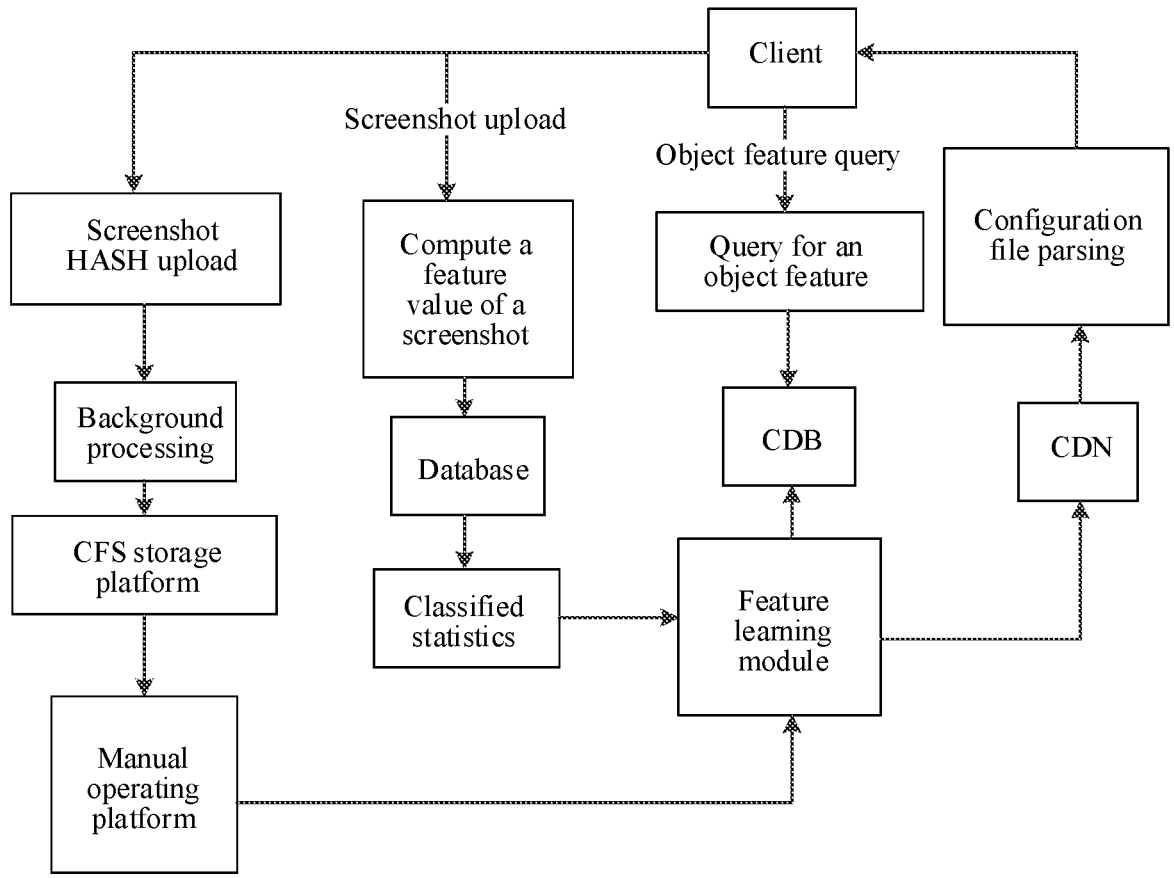
FIG. 6 is a flowchart of processing data by a server according to another embodiment of this application.

FIG. 6 is a flowchart of processing data by a server according to another embodiment of this application. As shown in FIG. 6, the client determines whether to block an object according to the first blocking strategy library (corresponding to querying features of an object in FIG. 6). When whether to block the object cannot be determined according to the first blocking strategy library, the client sends the feature information of the target object to the server, and the server receives the feature information of the target object sent by the client and sends an object query request carrying the feature information to a CDB. The CDB queries whether to block the target object according to the feature information and the second blocking strategy library and feeds back a query result to the client. The CDB stores the second blocking strategy library and the second blocking strategy library includes a strategy obtained by learning through a feature learning module. When the detection result received by the client is that whether to block the target object cannot be determined, the client uploads the response information to the server. For example, referring to FIG. 6, the client may upload a window screenshot (corresponding to screenshot HASH upload) and the response information to the server. The server performs background processing on the window screenshot and stores it in a CFS. Thereafter, the manual operating platform may read information from the CFS regularly to extract features, and send the extracted features and the response information to the feature learning module. Meanwhile, the server may further form the feature information into data according to a certain organization manner, for example, calculate a HASH value of the window screenshot, perform classified statistics on the formed data through classified statistics, and then send the statistical result to the feature learning module. Thus, the feature learning module may learn an object having what features needs to be blocked or an object having what features does not need to be blocked, that is, generate and obtain the object blocking strategy. Referring to FIG. 6, the feature learning module may send the generated object blocking strategy to the CDB to be stored, and furthermore, deliver the generated object blocking strategy to the client through the CDN. The CDN may send the object blocking strategy to the client in a form of a configuration file, and correspondingly, the client can parse the configuration file to obtain a newly added object blocking strategy. During actual implementation, since a data structure at a client side may be different from a data structure at a server side, the server may further convert the generated object blocking strategy to a strategy that can be supported by the client through a configuration parser, and then deliver the converted strategy to the client through the configuration file.

Step 412: The client receives the target blocking strategy fed back by the server.

Step 413: The client adds the target blocking strategy to the first blocking strategy library.

Step 414: The client performs subsequent object blocking according to the first blocking strategy library added with the target blocking strategy.

Figure 7:
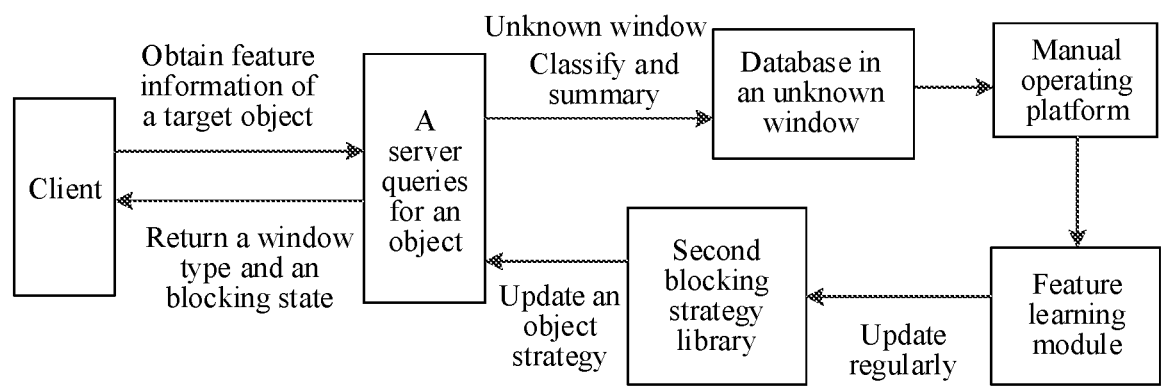
FIG. 7 is a flowchart of interaction between a client and a server according to another embodiment of this application.

In short, referring to FIG. 7, when the client cannot determine whether to block the target object, the client may send the feature information of the target object to the server to query whether to block the target object. When the server cannot determine whether to block the target object, the server may store the received feature information in an unknown window database. Furthermore, the server reads the information from the unknown window database through the manual operating platform, performs feature learning to obtain features of the object, where whether to block the object cannot be determined, and store the extracted features in an object feature database. Thereafter, after performing learning according to the features in the object feature database and generating the object blocking strategy, the feature learning module feeds back the object blocking strategy to the client. Specifically, the generated object blocking strategy may be updated to the second blocking strategy library, and at the same time, updated to the first blocking strategy library at the client.

It should be noted that, in the foregoing embodiment, since content in some new windows may not be blocked, before detecting whether to block the target object, the client may further perform the following step:

Detect whether the target object satisfies a preset condition.

The preset condition includes at least one of the following conditions:

The first condition is that the popup window corresponding to the target object is a top window (e.g., a window in the foreground, a foremost window on the desktop, a window floating on top of another window, etc.). When the popup window corresponding to the target object is not at a top layer position, a user is hardly influenced, and at this time, no processing needs to be performed, and therefore, the preset condition can include the foregoing content.

The second condition is that, the popup window corresponding to the target object is in a preset area. Under a normal condition, an object popup window may appear at, for example, a center or a lower right position of a display screen, that is, when the popup window is not in the preset area, the content in the popup window may not be the object, and therefore, the preset condition may include the content.

The third condition is that the window size of the popup window corresponding to the target object is a preset size or is within a preset window size range. Under a normal condition, a window size of a popup window corresponding to an object published by the same merchant is constant. If a window size of a popup window corresponding to a target object is not the preset size, it indicates that the content in the popup window usually is not an object.

The fourth condition is that, object content of the target object does not belong to a local cache. The local cache stores data that is often accessed by a user. If the object content of the target object belongs to the local cache, it represents that the popup window corresponding to the target object is opened by the user and is not an object that needs to be blocked.

If the preset condition is satisfied, when whether to block the target object cannot be determined, the feature information of the target object is sent to the server.

If the detection result is that the preset condition is not satisfied, the procedure is ended.

Whether the target object satisfies the preset condition is detected first, and then, the foregoing procedure is performed only when the target object satisfies the preset condition, and is ended when the target object does not satisfy the preset condition, thereby reducing processing complexity at the client.

Figure 8:
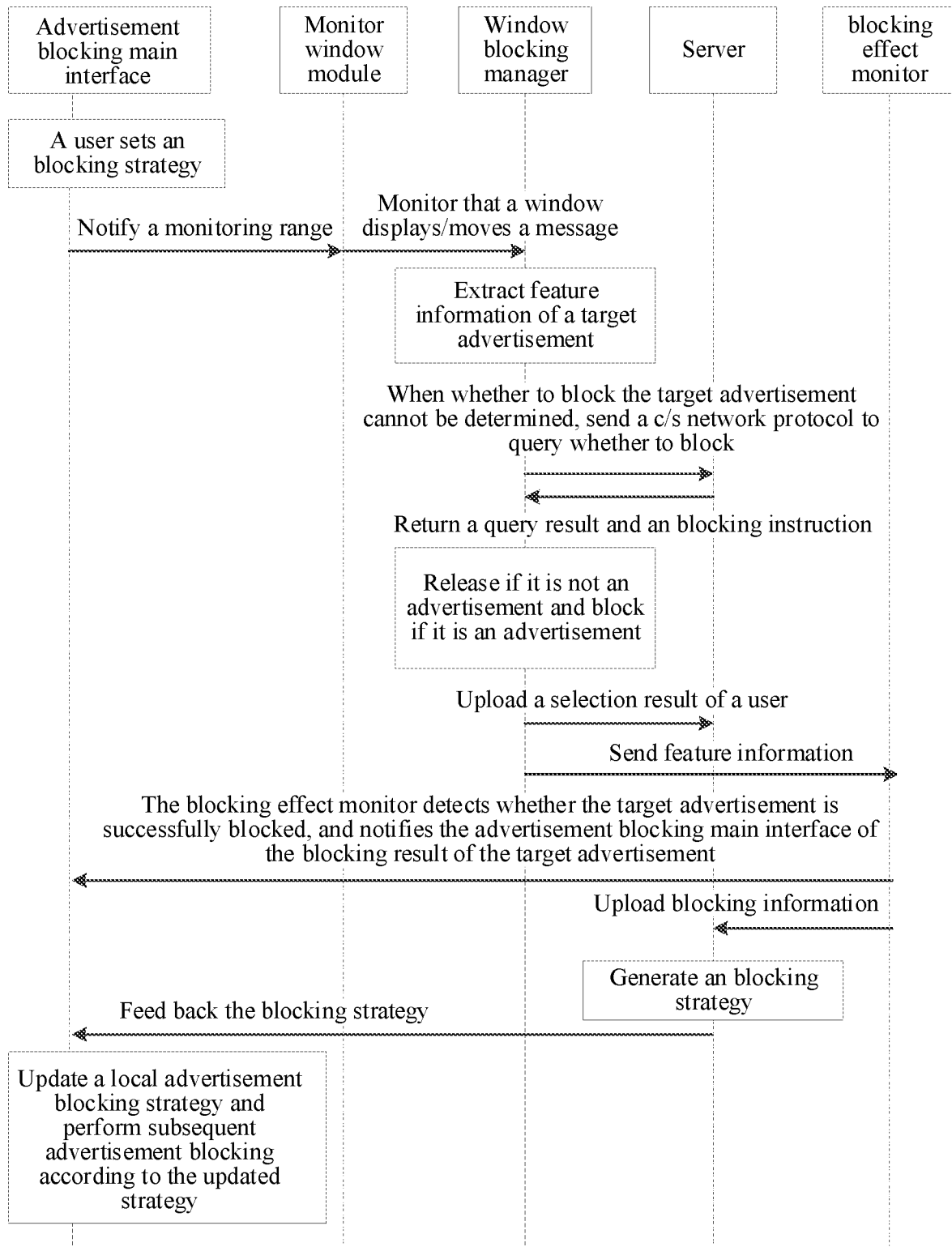
FIG. 8 is a flowchart of blocking a target object by a client according to another embodiment of this application.

It should be additionally noted that, an object blocking main interface, a monitor window module, a window blocking manager, and a blocking effect monitor may be set in the client. Therefore, based on the foregoing solution, the object blocking method will be introduced below with reference to specific composition of the client. As shown in FIG. 8, the object blocking method is described by taking an advertisement as an example. The method includes the following steps:

1. A client provides an advertisement blocking main interface that is used for a user to set an advertisement blocking strategy.

2. The advertisement blocking main interface notifies the monitor window module of a range of target advertisements that need to be monitored.

3. When monitoring that the window is displayed or moved, the monitor window module notifies the window blocking manager.

4. The window blocking manager extracts feature information of a target advertisement, filters advertisements that need to be released according to the preset condition, and when whether to block the target advertisement cannot be determined according to the first blocking strategy library, sends a c/s network protocol to query the server to determine whether to block the target advertisement.

5. The server receives the query sent by the window blocking manager and returns a query result and a blocking instruction to the window blocking manager.

6. The window blocking manager, according to the blocking instruction fed back by the server, releases a popup window not corresponding to an advertisement and block a popup window corresponding to an advertisement.

7. If the query result fed back by the server is that whether to block the target advertisement cannot be determined, the window blocking manager queries the user to determine whether to block the target advertisement.

8. The window blocking manager uploads a selection result of the user to the server, and at the same time, uploads the feature information of the target advertisement to the blocking effect monitor.

9. The blocking effect monitor detects whether the target advertisement is successfully blocked, and notifies the advertisement blocking main interface of the blocking result of the target advertisement.

10. The blocking effect monitor uploads the blocking information to the server.

11. The server generates a blocking strategy according to the blocking information and feeds back the blocking strategy to the advertisement blocking main interface.

12. The advertisement blocking main interface updates a local advertisement blocking strategy and performs subsequent advertisement blocking according to the updated strategy.

In view of the above, in the advertisement blocking method in some embodiments, through adding interaction between the client and the server, when the client cannot determine whether to block the target advertisement according to the first blocking strategy library, the client sends the feature information of the target advertisement to the server, the server may generate the corresponding target blocking strategy according to the received feature information and feed back the same, and the client blocks following advertisements according to the first blocking strategy library added with the target blocking strategy, to achieve the effect that when a similar advertisement appears subsequently, the client may determine whether to block the advertisement according to the first blocking strategy library added with the target blocking strategy and an accuracy rate of advertisement blocking is enhanced.

Figure 9:
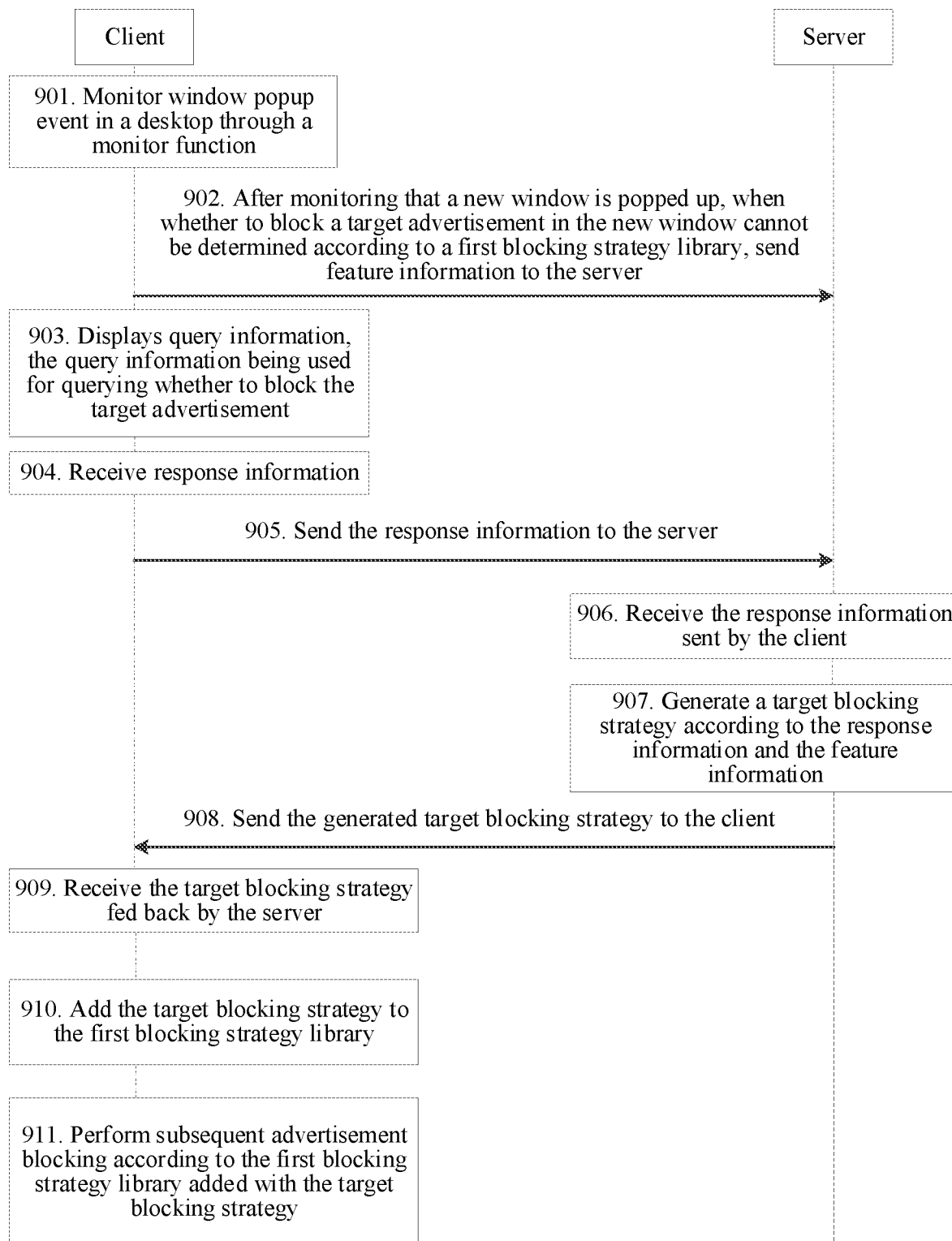
FIG. 9 is yet another flowchart of an object blocking method according to yet another embodiment of this application.

FIG. 9 is yet another method flowchart of an object blocking method according to yet another embodiment of this application. For example, in some embodiments, the object blocking method is used in an implementation environment shown in FIG. 1. As shown in FIG. 9, the object blocking method is described by taking an advertisement as an example. The object blocking method includes the following steps:

Step 901: A client monitors a popup window that is changed in a desktop through a monitor function.

Step 902: After monitoring that a new window is popped up, when whether to block a target advertisement in the new window cannot be determined according to a first blocking strategy library, the client sends feature information to the server.

Steps 901 and 902 are similar to Steps 201 and 202 in the foregoing embodiment, and will not be described herein repeatedly.

Step 903: The client displays query information, and the query information is used for querying whether to block the target advertisement.

Step 904: The client receives response information.

Step 905: The client sends the response information to the server.

Step 906: The server receives the response information sent by the client.

Step 907: The server generates a target blocking strategy according to the response information and the feature information.

Step 908: The server sends the generated target blocking strategy to the client.

Step 909: The client receives the target blocking strategy fed back by the server.

Step 910: The client adds the target blocking strategy to the first blocking strategy library.

Step 911: The client performs subsequent advertisement blocking according to the first blocking strategy library added with the target blocking strategy.

Steps 903 to 911 are similar to Steps 406 to 414 in the foregoing embodiment, and will not be described herein repeatedly.

In view of the above, in the object blocking method in some embodiments, through adding interaction between the client and the server, when the client cannot determine whether to block the target object according to the first blocking strategy library, the client sends the feature information of the target object to the server, the server may generate the corresponding target blocking strategy according to the received feature information and feed back the same, and the client blocks following objects according to the first blocking strategy library added with the target blocking strategy, to achieve the effect that when a similar object appears subsequently, the client may determine whether to block the object according to the first blocking strategy library added with the target blocking strategy and an accuracy rate of object blocking is enhanced.

It should be additionally noted that, in the foregoing embodiment, before the client determines whether to block the target object according to the first blocking strategy library, the client may further obtain a publisher signature of the target object and detects whether the publisher signature belongs to a preset signature library. If the publisher signature belongs to the preset signature library, the procedure is ended, and otherwise, the client performs a step of detecting whether to block the target object. The publisher signature is usually a signature of the merchant publishing the target object and signatures in the preset signatures are signatures of merchants that are pre-stored in the client and mean releasing. For example, the client is published by a merchant A. To ensure that an object published by the merchant A can be released, a designer may, when publishing the client, write a merchant signature of the merchant A in a preset signature library. Then, after the client monitors an object published by the merchant A, since the obtained signature of the object belongs to the preset signature library, the client performs direct releasing. Furthermore, for example, the client is published by the merchant A and a merchant B has a cooperation relationship with the merchant A. To ensure that an object published by the merchant B can be released, a designer may, when publishing the client, write a merchant signature of the merchant B in the preset signature library. Then, after the client monitors an object published by the merchant B, since the obtained signature of the object belongs to the preset signature library, the client performs direct releasing.

It should be additionally noted that, in the foregoing embodiments, the steps at the client side may be independently implemented as an object blocking method at the client side and the steps at the server side may be independently implemented as an object blocking method at the server side.

Figure 10:
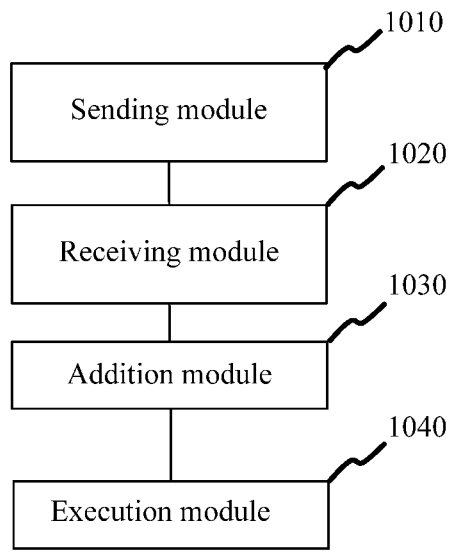
FIG. 10 is a schematic structural diagram of an object blocking apparatus according to an embodiment of this application.

FIG. 10 is a schematic structural diagram of an object blocking apparatus according to an embodiment of this application. As shown in FIG. 10, the object blocking apparatus may include: a sending module 1010, a receiving module 1020, and an addition module 1030.

The sending module 1010 is configured to send, when whether to block a target object cannot be determined according to a first blocking strategy library, feature information of the target object to a server, the feature information being used for instructing the server to generate a target blocking strategy according to the feature information and feed back the target blocking strategy.

The receiving module 1020 is configured to receive the target blocking strategy fed back by the server.

The addition module 1030 is configured to add the target blocking strategy to the first blocking strategy library.

An execution module 1040 is configured to perform subsequent object blocking according to the first blocking strategy library added with the target blocking strategy.

In view of the above, in the object blocking apparatus in some embodiments, through adding interaction between the client and the server, when the client cannot determine whether to block the target object according to the first blocking strategy library, the client sends the feature information of the target object to the server, the server may generate the corresponding target blocking strategy according to the received feature information and feed back the same, and the client blocks following objects according to the first blocking strategy library added with the target blocking strategy, to achieve the effect that when a similar object appears subsequently, the client may determine whether to block the object according to the first blocking strategy library added with the target blocking strategy and an accuracy rate of object blocking is enhanced.

Based on the object blocking apparatus provided according to the foregoing embodiment, the apparatus further includes:

A display module is configured to display query information, the query information being used for querying whether to block the target object; and An obtaining module is configured to obtain response information.

The sending module 1010 is further configured to send the response information to the server, the response information being used for instructing the server to generate the target blocking strategy according to the response information and the feature information and feed back the target blocking strategy.

The apparatus further includes:

The receiving module 1020 is further configured to receive a detection result fed back by the server, the detection result being a result of whether to block the target object determined by the server according to a second blocking strategy library and the received feature information.

The execution module 1040 is further configured to perform the step of displaying query information when the detection result shows that whether to block the target object cannot be determined. The apparatus further includes: a monitor module.

The monitor module is configured to monitor a popup window that is changed in a desktop through a monitor function; and after monitoring that a new window is popped up, perform the step of, when whether to block the target object cannot be determined according to a first blocking strategy library, sending feature information of the target object to the server, the new window carrying the target object.

The apparatus further includes a filter module.

The filter module is configured to perform, when the target object satisfies a preset condition, the step of sending, when whether to block a target object cannot be determined according to a first blocking strategy library, feature information of the target object to the server, the preset condition includes at least one of following conditions:

The popup window corresponding to the target object is a top window.

The popup window corresponding to the target object is in an effective area.

The window size of the popup window corresponding to the target object is a preset size.

The object content of the target object does not belong to a local cache.

Figure 11:
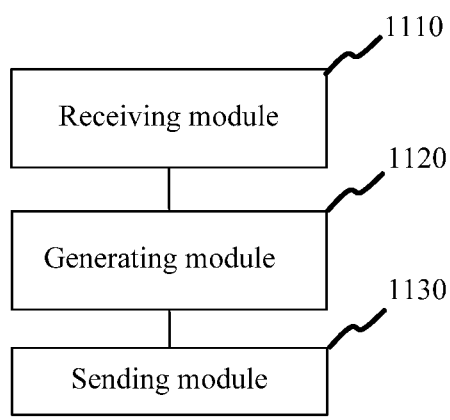
FIG. 11 is another schematic structural diagram of an object blocking apparatus according to another embodiment of this application.

FIG. 11 is another schematic structural diagram of an object blocking apparatus according to another embodiment of this application. As shown in FIG. 11, the object blocking apparatus may include: a receiving module 1110, a generating module 1120, and a sending module 1130.

The receiving module 1110 is configured to receive feature information of a target object sent by a client, the feature information is information sent by the client when the client cannot determine whether to block the target object according to a first blocking strategy library.

The generating module 1120 is configured to generate a target blocking strategy according to the feature information.

The sending module 1130 is configured to send the generated target blocking strategy to the client, the target blocking strategy being used for instructing the client to add the target blocking strategy to the first blocking strategy library.

In view of the above, in the object blocking apparatus in some embodiments, through adding interaction between the client and the server, when the client cannot determine whether to block the target object according to the first blocking strategy library, the client sends the feature information of the target object to the server, the server may generate the corresponding target blocking strategy according to the received feature information and feed back the same, and the client blocks following objects according to the first blocking strategy library added with the target blocking strategy, to achieve the effect that when a similar object appears subsequently, the client may determine whether to block the object according to the first blocking strategy library added with the target blocking strategy and an accuracy rate of object blocking is enhanced.

Based on the object blocking apparatus provided according to the foregoing embodiment, the apparatus further includes:

The receiving module 1110 is further configured to receive response information sent by the client.

The generating module 1120 is further configured to generate the target blocking strategy according to the response information and the feature information.

The apparatus further includes a feedback module.

The feedback module is configured to feed back a detection result of whether to block the target object to the client according to a second blocking strategy library and the feature information.

It should be noted that, when the object blocking apparatus provided in the foregoing embodiment is only described by division of the foregoing function modules. In a practical application, the functions may be allocated to and completed by different function modules according to requirements. That is, an internal structure of the server is divided into different function modules, to complete all or some of the functions described above. In addition, the objection blocking apparatus and the objection blocking method provided in the foregoing embodiments belong to the same concept. For a specific implementation process, refer to the method embodiment, and details are not described herein again.

An embodiment of this application further provides a computer readable storage medium. The computer readable storage medium may be a computer readable storage medium included in a memory, or may be a computer readable storage medium that exists alone and is not assembled into a terminal or a server. The computer readable storage medium stores at least one instruction, at least one program, a code set or an instruction set. Furthermore, when the computer readable storage medium is stored in a terminal, the at least one instruction, the at least one program, the code set or the instruction set is loaded and executed by the processor to implement the object blocking method at the client side.

When the computer readable storage medium is used in a server, the at least one instruction, the at least one program, the code set, or the instruction set is loaded and executed by the processor to implement the object blocking method at the server side.

Figure 12:
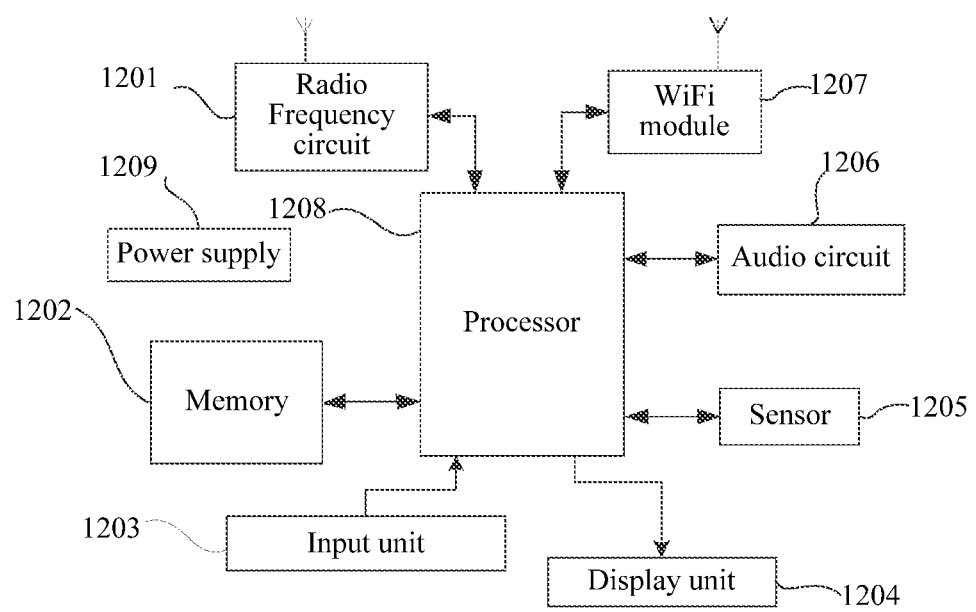
FIG. 12 is a schematic diagram of a terminal according to an embodiment of this application.

FIG. 12 is a block diagram of a terminal 1200 according to an embodiment of this application. As shown in FIG. 12, the terminal may include a Radio Frequency (RF) circuit 1201, a memory 1202 including one or more computer readable storage mediums, an input unit 1203, a display unit 1204, a sensor 1205, au audio circuit 1206, a Wireless Fidelity (Wi-Fi) module 1207, a processor 1208 including one or more processing cores, and a power supply 1209. A person skilled in the art may understand that the structure of the terminal shown in FIG. 12 does not constitute a limitation to the terminal, and the terminal may include more components or fewer components than those shown in the figure, or some components may be combined, or a different component deployment may be used. Where:

The RF circuit 1201 may be configured to receive and send signals during an information receiving and sending process or a call process. Particularly, the RF circuit receives downlink information from a base station, then delivers the downlink information to one or more processors 1208 for processing, and sends related uplink data to the base station. Generally, the RF circuit 1201 includes, but is not limited to, an antenna, at least one amplifier, a tuner, one or more oscillators, a subscriber identity module (SIM) card, a transceiver, a coupler, a low noise amplifier (LNA), and a duplexer. In addition, the RF circuit 1201 may also communicate with a network and another device through wireless communication. The wireless communication may use any communication standard or protocol, including but not limited to Global System of Mobile Communication (GSM), General Packet Radio Service (GPRS), Code Division Multiple Access (CDMA), Wideband Code Division Multiple Access (WCDMA), Long Term Evolution (LTE), email, Short Messaging Service (SMS), and the like.

The memory 1202 may be configured to store a software program and module. The processor 1208 runs the software program and module stored in the memory 1202, to implement various functional applications and data processing. The memory 1202 may mainly include a program storage area and a data storage area. The program storage area may store an operating system, an application program required by at least one function (such as a sound playback function and an image display function), and the like. The data storage area may store data (such as audio data and an address book) created according to the use of the terminal, and the like. In addition, the memory 1202 may include a high-speed random access memory, and may further include a non-volatile memory such as at least one magnetic disk storage device, a flash memory device, or another volatile solid storage device. Correspondingly, the memory 1202 may further include a memory controller, to provide access of the processor 1208 and the input unit 1203 to the memory 1202.

The input unit 1203 may be configured to receive input digit or character information, and generate a keyboard, mouse, joystick, optical, or track ball signal input related to the user setting and function control. Specifically, in a specific embodiment, the input unit 1203 may include a touch sensitive surface and another input device. The touch-sensitive surface, which may also be referred to as a touch-screen or a touch panel, may collect a touch operation of a user on or near the touch-sensitive surface (such as an operation of a user on or near the touch-sensitive surface by using any suitable object or accessory, such as a finger or a stylus), and drive a corresponding connection apparatus according to a preset program. Optionally, the touch-sensitive surface may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 1208. In addition, the touch controller can receive a command sent by the processor 1208 and execute the command. In addition, the touch-sensitive surface may be implemented by a resistive, capacitive, infrared, or surface sound wave type touch-sensitive surface. In addition to the touch-sensitive surface, the input unit 1203 may further include another input device. Specifically, the another input device may include, but is not limited to, one or more of a physical keyboard, a functional key (such as a volume control key or a switch key), a track ball, a mouse, and a joystick.

The display unit 1204 may be configured to display information input by the user or information provided for the user, and various graphical user interfaces of the terminal. These graphical user interfaces may include a graph, text, an icon, a video and any combination thereof. The display unit 1204 may include a display panel, and the display panel may be configured by using a liquid crystal display (LCD), an organic light-emitting diode (OLED), or the like. Further, the touch-sensitive surface may cover the display panel. After detecting a touch operation on or near the touch-sensitive surface, the touch-sensitive surface transfers the touch operation to the processor 1208, so as to determine a type of the touch event. Then, the processor 1208 provides a corresponding visual output on the display panel according to the type of the touch event. Although, in FIG. 12, the touch-sensitive surface and the display panel are used as two separate parts to implement input and output functions, but in some embodiments, the touch-sensitive surface and the display panel may be integrated to implement the input and output functions.

The terminal may further include at least one sensor 1205 such as an optical sensor, a motion sensor, and other sensors. Specifically, the optical sensor may include an ambient light sensor and a proximity sensor. The ambient light sensor may adjust luminance of the display panel according to brightness of the ambient light. The proximity sensor may switch off the display panel and/or backlight when the terminal is moved to the ear. As one type of the motion sensor, a gravity acceleration sensor may detect a value of acceleration at each direction (which generally is triaxial), may detect a value and a direction of the gravity when being static, and may be configured to identify an application of a mobile phone gesture (such as a handover between horizontal and longitudinal screens, a related game, and gesture calibration of a magnetometer), a related function of vibration identification (such as a pedometer and a knock), and the like. Another sensor, such as a gyroscope, a barometer, a hygrometer, a thermometer, and an infrared sensor, which can be configured in the terminal, is not described herein again.

The audio circuit 1206, the speaker, and the microphone may provide audio interfaces between the user and the terminal. The audio circuit 1206 may convert received audio data into an electrical signal and transmit the electrical signal to the speaker. The speaker converts the electrical signal into a sound signal for output. On the other hand, the microphone converts a collected sound signal into an electrical signal. The audio circuit 1206 receives the electrical signal, converts the electrical signal into audio data, and outputs the audio data to the processor 1208 for processing. Then, the processor sends the audio data to, for example, another terminal by using the RF circuit 1201, or outputs the audio data to the memory 1202 for further processing. The audio circuit 1206 may further include an earplug jack, to provide communication between a peripheral earphone and the terminal.

Wi-Fi belongs to a short distance wireless transmission technology. The terminal may help, by using the Wi-Fi module 1207, a user to receive and send an email, browse a web page, access stream media, and the like. This provides wireless broadband Internet access for the user. Although FIG. 12 shows the Wi-Fi module 1207, it may be understood that the Wi-Fi module 1207 is not a necessary component of the terminal, and the Wi-Fi module may be omitted as required provided that the scope of the essence of the present disclosure is not changed.

The processor 1208 is the control center of the terminal, and is connected to various parts of the mobile phone by using various interfaces and lines. By running or executing the software program and/or module stored in the memory 1202, and invoking data stored in the memory 1202, the processor performs various functions and data processing of the terminal, thereby performing overall monitoring on the mobile phone. The processor 1208 may include one or more processing cores. The processor 1208 may integrate an application processor and a modem processor. The application processor mainly processes an operating system, a user interface, an application program, and the like. The modem processor mainly processes wireless communication. It may be understood that the foregoing modem processor may alternatively not be integrated into the processor 1208.

The terminal further includes the power supply 1209 (such as a battery) for supplying power to the components. The power supply may be logically connected to the processor 1208 by using a power management system, thereby implementing functions such as charging, discharging, and power consumption management by using the power management system. The power supply 1209 may further include one or more direct current power supplies or alternating current power supplies, a re-charging system, a power failure detection circuit, a power supply converter or inverter, a power supply state indicator, and any other component.

Although not shown in the figure, the terminal may further include a camera, a Bluetooth module, and the like, which are not further described herein. Specifically, in some embodiments, the processor 1208 in the terminal will run the at least one instruction, at least one program, the code set or the instruction set stored in the memory 1202, and the at least one instruction, the at least one program, the code set, or the instruction is loaded and executed by the processor, to implement the object blocking method at the client side.

Figure 13:
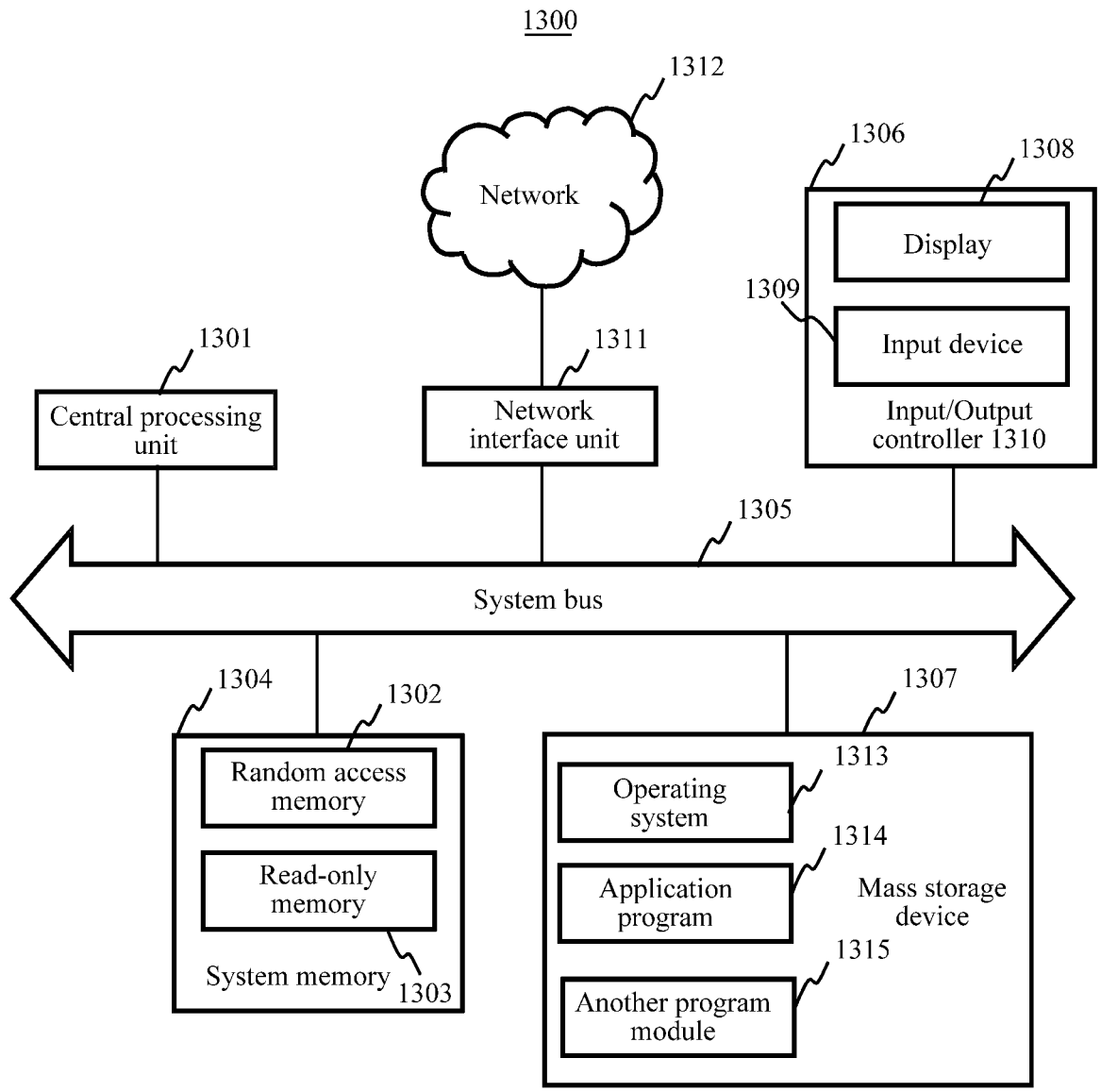
FIG. 13 is a schematic diagram of a server according to an embodiment of this application.

FIG. 13 is a schematic structural diagram of a server according to an embodiment of this application. As shown in FIG. 13, the server is used for implementing the object blocking method at the server side provided in the foregoing embodiment. Specifically:

A server 1300 includes a central processing unit (CPU) 1301, a system memory 1304 including a random access memory (RAM) 1302 and a read-only memory (ROM) 1303, and a system bus 1305 connecting the system memory 1304 and the CPU 1301. The server 1300 further includes a basic input/output system (I/O system) 1306 for transmitting information between components in a computer, and a mass storage device 1307 used for storing an operating system 1313, an application program 1314, and another program module 1315.

The basic I/O system 1306 includes a display 1308 configured to display information, and an input device 1309 used by a user to input information, such as a mouse or a keyboard. The display 1308 and the input device 1309 are connected to an input/output controller 1310 of the system bus 1305, to be connected to the CPU 1301. The basic I/O system 1306 may further include the input/output controller 1310, to receive and process inputs from multiple other devices, such as the keyboard, the mouse, or an electronic stylus. Similarly, the input/output controller 1310 further provides an output to a display screen, a printer or another type of output device.

The mass storage device 1307 is connected to the CPU 1301 by using a mass storage controller (not shown) connected to the system bus 1305. The mass storage device 1307 and an associated computer readable medium provide non-volatile storage for the server 1300. That is, the mass storage device 1307 may include a computer readable medium (not shown), such as a hard disk or a CD-ROM drive.

Without loss of generality, the computer readable medium may include a computer storage medium and a communication medium. The computer storage medium includes volatile and non-volatile media, and removable and non-removable media implemented by using any method or technology and configured to store information such as a computer-readable instruction, a data structure, a program module, or other data. The computer storage medium includes a RAM, a ROM, an EPROM, an EEPROM, a flash memory, or other solid storage technologies; a CD-ROM, a DVD, or other optical storages; and a cassette, a magnetic tape, a disk storage, or other magnetic storage devices. Certainly, a person skilled in the art may know that the computer storage medium is not limited to the foregoing types. The system memory 1304 and the mass storage device 1307 may be collectively referred to as a memory.

According to the embodiments of this application, the server 1300 may further be connected, through a network such as the Internet, to a remote computer on the network. That is, the server 1300 may be connected to a network 1312 by using a network interface unit 1311 connected to the system bus 1305, or may be connected to another type of network or a remote computer system (not shown) by using a network interface unit 1311.

The memory further includes at least one instruction, at least one program, the code set or the instruction set, and the at least one instruction, the at least one program, the code set, or the instruction set is loaded and executed by the processor, to implement the object blocking method at the server side.

It should be understood that, a singular form "one" ("an", "an", and "the") used herein also includes a plural form, unless an exception is supported clearly in the context. It should further be understood that, the word "and/or" used herein includes any or all possible combinations of one or more associated items that are listed.

The sequence numbers of the foregoing embodiments of this application are merely for description purpose and do not indicate the preference of the embodiments.

A person of ordinary skill in the art may understand that all or some of the steps of the foregoing embodiments may be implemented by using hardware, or may be implemented by a program instructing relevant hardware. The program may be stored in a computer readable storage medium. The storage medium may be a ROM, a magnetic disk, an optical disc, or the like.

The foregoing descriptions are merely preferred embodiments of this application, but are not intended to limit this application. Any modification, equivalent replacement, or improvement made within the spirit and principle of the embodiments of this application shall fall within the protection scope of the embodiments of this application.

What is claimed is:

1. An object blocking method, applied to a terminal device, comprising:
   determining whether to block a target object according to a first blocking strategy library;
   obtaining a publisher signature of the target object and detecting whether the publisher signature belongs to a preset signature library, wherein the target object is published by a first merchant, and the publisher signature belongs to a second merchant in cooperation relationship with the first merchant;
   when the step of determining cannot determine whether to block a target object according to the first blocking strategy library, and in response to and after determining the publisher signature of the second merchant does not exist in the preset signature library, sending feature information of the target object to a server, the feature information being used for instructing the server to generate a target blocking strategy according to the feature information and feed back the target blocking strategy;
   receiving the target blocking strategy fed back by the server, the target blocking strategy being determined by the server according to a second blocking strategy library and the feature information, wherein the second blocking strategy library includes a blocking strategy generated by a different terminal device, wherein the target blocking strategy includes the blocking strategy generated by the different terminal device, and wherein the target blocking strategy corresponds to publisher information publishing the target object and the publisher information includes Portable Executable (PE) file information;
   adding the target blocking strategy to the first blocking strategy library; and
   performing subsequent object blocking according to the first blocking strategy library added with the target blocking strategy, including: determining whether to block the target object according to the target blocking strategy in the first blocking strategy library.

2. The method according to claim 1, before the receiving the target blocking strategy fed back by the server, further comprising:
   when the step of determining cannot determine whether to block the target object, receiving from the server query information about whether to block the target object;
   displaying query information about whether to block the target object, the query information as displayed including a first option to block and a second option not to block;
   obtaining response information corresponding to the query information, the response information including a selection of the first option to block or the second option not to block; and
   sending the response information to the server, the response information being used for instructing the server to generate the target blocking strategy according to the response information and the feature information and feed back the target blocking strategy.

3. The method according to claim 2, before the displaying query information, further comprising:
   receiving a detection result fed back by the server, the detection result being a result of whether to block the target object determined by the server according to the second blocking strategy library and the feature information; and
   performing the step of displaying query information when the detection result shows whether to block the target object cannot be determined.

4. The method according to claim 1, before the sending, when whether to block a target object cannot be determined according to a first blocking strategy library, feature information of the target object to a server, further comprising:
  monitoring a window popup event on a desktop of the terminal device; and
  in response to detecting a new window is popped up, determining whether to block the target object according to the first blocking strategy library, the new window carrying the target object.

5. The method according to claim 1, further comprising:
  establishing the first blocking strategy library at the terminal device, including:
    displaying procedures running on the terminal device;
    receiving a setting instruction marking each of the procedures as to be blocked or to be released; and
    storing the each of the procedures as marked in the first blocking strategy library.

6. The method according to claim 5, further comprising:
  generating a black-list of the procedures marked as to be blocked and a white-list of the procedures marked as to be released; and
  storing the black-list and the white-list in the first blocking strategy library.

7. The method according to claim 1, further comprising:
  prior to performing the subsequent object blocking according to the first blocking strategy library added with the target blocking strategy, writing in a client of the terminal device the first blocking strategy library added with the target blocking strategy; and
  storing the first blocking strategy library added with the target blocking strategy.

8. The method according to claim 1, wherein the target blocking strategy further corresponds to window information of a popup window displaying the target object, and the window information includes one or more of a window size, a window title, a window position, a screenshot Hash value, or a window screenshot.

9. The method according to claim 1, further comprising:
  prior to sending the feature information of the target object to the server, determining whether a preset condition is satisfied, by:
    determining that object content of the target object does not belong to a local cache opened by a user of the terminal device;
    determining that a popup window corresponding to the target object is a top window;
    determining that the popup window corresponding to the target object is located in a preset area; and
    determining that the popup window corresponding to the target object is of a preset window size; and
  in response to determining the preset condition is satisfied, sending the feature information of the target object to the server.

10. A terminal, comprising: a memory and a processor coupled to the memory, the processor being configured to perform:
  determining whether to block a target object according to a first blocking strategy library;
  obtaining a publisher signature of the target object and detecting whether the publisher signature belongs to a preset signature library, wherein the target object is published by a first merchant, and the publisher signature belongs to a second merchant in cooperation relationship with the first merchant;
  when the step of determining cannot determine whether to block a target object according to the first blocking strategy library, and in response to and after determining the publisher signature of the second merchant does not exist in the preset signature library, sending feature information of the target object to a server, the feature information being used for instructing the server to generate a target blocking strategy according to the feature information and feed back the target blocking strategy;
  receiving the target blocking strategy fed back by the server, the target blocking strategy being determined by the server according to a second blocking strategy library and the feature information, wherein the second blocking strategy library includes a blocking strategy generated by a different terminal device, wherein the target blocking strategy includes the blocking strategy generated by the different terminal device, and wherein the target blocking strategy corresponds to publisher information publishing the target object and the publisher information includes Portable Executable (PE) file information;
  adding the target blocking strategy to the first blocking strategy library; and
  performing subsequent object blocking according to the first blocking strategy library added with the target blocking strategy, including: determining whether to block the target object according to the target blocking strategy in the first blocking strategy library.

11. The terminal according to claim 10, wherein the processor is further configured to perform:
  before receiving the target blocking strategy from the server, and when the step of determining cannot determine whether to block the target object, receiving from the server query information about whether to block the target object;
  displaying query information about whether to block the target object, the query information as displayed includes a first option to block and a second option not to block;
  obtaining response information corresponding to the query information, the response information including a selection of the first option to block or the second option not to block; and
  sending the response information to the server, the response information being used for instructing the server to generate the target blocking strategy according to the response information and the feature information and feed back the target blocking strategy.

12. The terminal according to claim 11, wherein the processor is further configured to perform:
  before the displaying query information, receiving a detection result fed back by the server, the detection result being a result of whether to block the target object determined by the server according to the second blocking strategy library and the feature information; and
  performing the step of displaying query information when the detection result shows whether to block the target object cannot be determined.

13. The terminal according to claim 10, wherein the processor is further configured to perform:
  before sending the feature information of the target object to the server, monitoring a window popup event on a desktop of the terminal; and
  in response to detecting a new window is popped up, determining whether to block the target object according to the first blocking strategy library, the new window carrying the target object.

14. A non-transitory computer readable storage medium storing at least one instruction, being loaded and executed by a processor of a terminal device to perform:
- determining whether to block a target object according to a first blocking strategy library;
- obtaining a publisher signature of the target object and detecting whether the publisher signature belongs to a preset signature library, wherein the target object is published by a first merchant, and the publisher signature belongs to a second merchant in cooperation relationship with the first merchant;
- when the step of determining cannot determine whether to block a target object according to the first blocking strategy library, and in response to and after determining the publisher signature of the second merchant does not exist in the preset signature library, sending feature information of the target object to a server, the feature information being used for instructing the server to generate a target blocking strategy according to the feature information and feed back the target blocking strategy;
- receiving the target blocking strategy fed back by the server, the target blocking strategy being determined by the server according to a second blocking strategy library and the feature information, wherein the second blocking strategy library includes a blocking strategy generated by a different terminal device, wherein the target blocking strategy includes the blocking strategy generated by the different terminal device, and wherein the target blocking strategy corresponds to publisher information publishing the target object and the publisher information includes Portable Executable (PE) file information;
- adding the target blocking strategy to the first blocking strategy library; and
- performing subsequent object blocking according to the first blocking strategy library added with the target blocking strategy, including: determining whether to block the target object according to the target blocking strategy in the first blocking strategy library.

15. The storage medium according to claim 14, wherein the at least one instruction causes the processor to further perform:
- before receiving the target blocking strategy from the server, and when the step of determining cannot determine whether to block the target object, receiving from the server query information about whether to block the target object;
- displaying query information about whether to block the target object, the query information as displayed includes a first option to block and a second option not to block;
- obtaining response information corresponding to the query information, the response information including a selection of the first option to block or the second option not to block; and
- sending the response information to the server, the response information being used for instructing the server to generate the target blocking strategy according to the response information and the feature information and feed back the target blocking strategy.

16. The storage medium according to claim 15, wherein the at least one instruction causes the processor to further perform:
- before the displaying query information, receiving a detection result fed back by the server, the detection result being a result of whether to block the target object determined by the server according to the second blocking strategy library and the feature information; and
- performing the step of displaying query information when the detection result shows whether to block the target object cannot be determined.

17. The storage medium according to claim 14, wherein the at least one instruction causes the processor to further perform:
- before sending the feature information of the target object to the server, monitoring a window popup event on a desktop of the terminal; and
- in response to detecting a new window is popped up, determining whether to block the target object according to the first blocking strategy library, the new window carrying the target object.

* * * * *